(No Model.)

W. N. WHITELEY.
DRIVE CHAIN.

No. 333,803. Patented Jan. 5, 1886.

WITNESSES:
Wm. T. Gill,
Wm. G. Anderson,

INVENTOR
W. N. Whiteley
BY R. D. O. Smith
his ATTORNEY

UNITED STATES PATENT OFFICE.

WILLIAM N. WHITELEY, OF SPRINGFIELD, OHIO.

DRIVE-CHAIN.

SPECIFICATION forming part of Letters Patent No. 333,803, dated January 5, 1886.

Application filed May 16, 1885. Serial No. 165,749. (No model.)

*To all whom it may concern:*

Be it known that I, WILLIAM N. WHITELEY, of Springfield, in the county of Clark and State of Ohio, have invented new and useful Improvements in Metal Drive-Chains; and I do hereby declare that the following is a full and accurate description of the same, reference being had to the accompanying drawings, in which—

Figure 1:
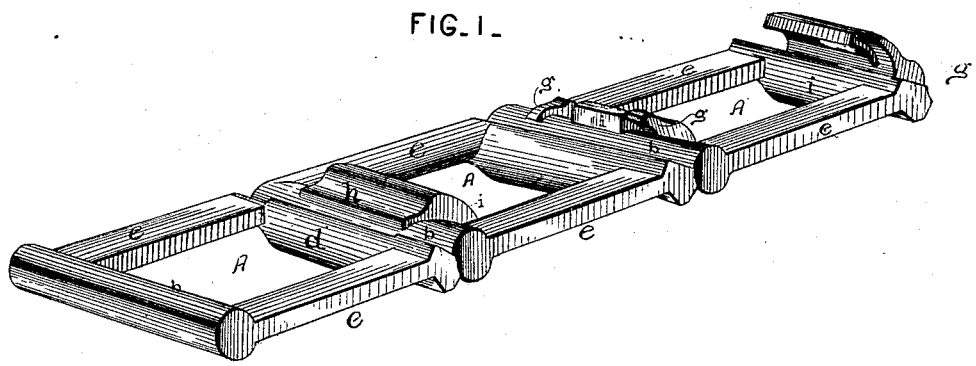
Figure 2:
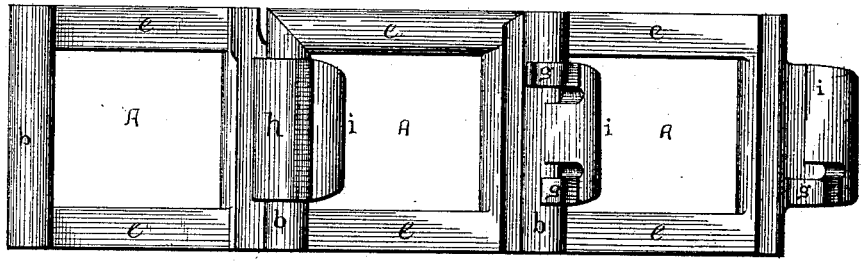
Figure 3:
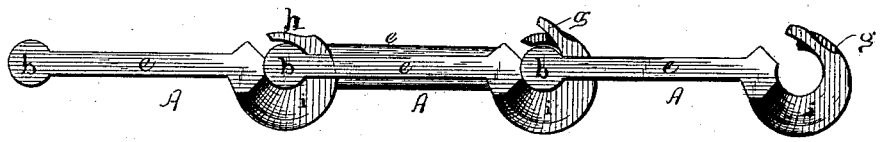

Figure 1 is a perspective view of my invention. Fig. 2 is a plan view of the same. Fig. 3 is an edge elevation.

Heretofore many metal separable-link drive-chains have been made, and many of them have been provided with lips or a part capable of being bent after the links were joined, in order to lock them and prevent their detachment afterward; therefore I do not claim, broadly, metal separable links which may be rendered inseparable by bending a part down after they have been joined together, but such links have always heretofore been cast with the hook or flexible part open; but experience has shown that best results cannot be attained in that way, because it is necessary either to use a chill which is not cylindrical and which is therefore difficult to place properly in the mold, or to make a seam across the inside of the hook at the junction of the rigid and flexible portions. To avoid these difficulties I cast the flexible part closed down upon a plane cylindrical chill, leaving said portion to be raised up before the entrance of the link to be attached, and closed down again afterward. I therefore confine my claim to the particular form and manner herein described and shown.

A represents one of the links referred to. It is rectangular in shape. Cross-bar $b$ is cylindrical, while $i$ is an open hook with a curvature slightly in excess of the curvature of cross-bar $b$, so that a similar cross-bar belonging to an adjacent link may be received within it. The hook $i$ has one or more spurs, $g$, partly detached and extending beyond its end, and made the same curvature, the object of which is to render said hook open or closed at will. When cast, it will be virtually a closed hook. The side bars, $e$ $e$, are in width equal to the diameter of cross-bar $b$, and are placed flatwise, as shown, so that in joining the links together either end of the cylindrical bar $b$ can be presented to the hook when it is open and slid into place and the hook closed, making a continuous inseparable chain. When the hook $i$ contains sufficient metal to possess the strength requisite to withstand the strain required to do the work intended to be done by said chain, it contains too much metal to be easily bent down to lock the link together, besides the blow of the hammer would bend the hook out of its true curve, thereby causing it to bind and not work smoothly, also causing great friction and unnecessary wear on said chain-links.

In my link there are shown one or more semi-detached parts or spurs, $g$, made somewhat longer than the hook $i$ and on the same curvature, made thinner toward the point, so that they can be easily opened to admit cross-bar $b$, and then may be bent down over said bar inside the bars $e$ $e$, as shown, which will effectually prevent the separation of the links, and at the same time the base part of said spur or parts is continuous and integral with bend of the hook $i$, and this chain-link is effectually locked, and all its parts are well fitted and equally strong. This link can be made with only one side bar flatwise and the other edgewise to its face, as shown in the center link; but I prefer to make it as shown in the end links.

I have described my chain-link constructed with one or more spurs, but in some cases it may be preferable to make it instead one continuous strip extending the full width of the hook, but made thinner toward the end than the main body of the hook, as shown at $h$, which, when made, the end portion can be easily opened to admit the joining of the links, and afterwards closing them down to render the chain inseparable. One of the objects of my invention is to so construct chain-links as that the coupler may be cast or formed upon a cylindrical piece of metal, so as to correctly form the hook-like portion, the lip or spur being an extended portion of the hook, as shown.

Having described my invention, I claim—

1. A chain-link constructed with a spur, $g$, projecting from its coupler end, thinner than the main body of the hook, and with its inner surface in continuation of the cylindrical curve of the inner surface of the hook, whereby said hook and spur may both be cast upon the same cylindrical chill, and without angle or seam across the wearing-surface.

2. A chain-link provided at one end with a coupler-hook, *i*, and a spur, *g*, thinner than said hook *i*, and joined to the side thereof back of its point, whereby it will be detached and free to be raised or depressed without changing the form of said hook.

WILLIAM N. WHITELEY.

In presence of—
F. C. HOUK,
F. B. FURNISS.